United States Patent [19]

Walters et al.

[11] 4,320,904
[45] Mar. 23, 1982

[54] SKID ATTACHMENT FOR SHOPPING CARTS

[76] Inventors: Donald N. Walters, 7655 Arnold Dr., North Tonawanda, N.Y. 14120; Theodore P. Link, Coleman Rd., Marilla, N.Y. 14102

[21] Appl. No.: 109,833

[22] Filed: Jan. 7, 1980

[51] Int. Cl.³ .............................................. B60F 5/00
[52] U.S. Cl. ................................... 280/7.12; 254/120; 280/9; 280/DIG. 4
[58] Field of Search .................. 280/8, 9, 10, 11, 7.12, 280/33.99 A, 33.99 C, 33.99 R, 47.26, DIG. 4; 254/120

[56] References Cited

U.S. PATENT DOCUMENTS

| | | | |
|---|---|---|---|
| 671,554 | 4/1901 | Heisler | 254/120 |
| 800,134 | 9/1905 | Bever | 254/120 UX |
| 1,118,720 | 11/1914 | Wise | 280/10 |
| 1,234,200 | 7/1917 | Newman | 280/9 |
| 1,275,521 | 8/1918 | Bowes et al. | 280/9 |
| 1,343,046 | 6/1920 | Fleckl et al. | 280/11 |
| 1,450,924 | 4/1923 | Ord | 280/11 |
| 1,511,801 | 10/1924 | Cochran | 254/120 |
| 2,137,860 | 11/1938 | Stedronsky | 280/9 |
| 2,518,561 | 8/1950 | Meschwitzer | 280/11 |
| 2,823,042 | 2/1958 | Gelbond | 280/33.99 C |
| 4,040,638 | 8/1977 | Flagg | 280/9 |
| 4,163,564 | 8/1979 | Kramer | 280/11 X |
| 4,191,391 | 3/1980 | Dorlini | 280/11 X |

FOREIGN PATENT DOCUMENTS 182211 11/1954 Austria ................................ 280/11

Primary Examiner—Joseph F. Peters, Jr.
Assistant Examiner—Michael Mar
Attorney, Agent, or Firm—Raymond F. Kramer

[57] ABSTRACT

A shopping cart incorporating a removable skid attachment, useful in operative position to allow easy movement of the cart over snowy and icy surfaces, as in supermarket parking lots, includes a pair of skid members near the front wheels of the cart, when the attachment is installed, which are selectively movable into inoperative storage position underneath the cart and into operative position with the skid surfaces thereof being lower than the front wheels of the cart, hand operable linkages for moving the skid members selectively into either inoperative or operative position, and fastening means for holding the skid members and the associated linkages to the cart. Preferably, the skid attachment includes stops for limiting the movements of the skid members, locking means for holding them in position and handle or equivalent means so that the skid members may be readily moved into desired positions. Additionally, the skids are of preferred shapes to give the cart stability and to facilitate movement through snow and over ice.

10 Claims, 7 Drawing Figures

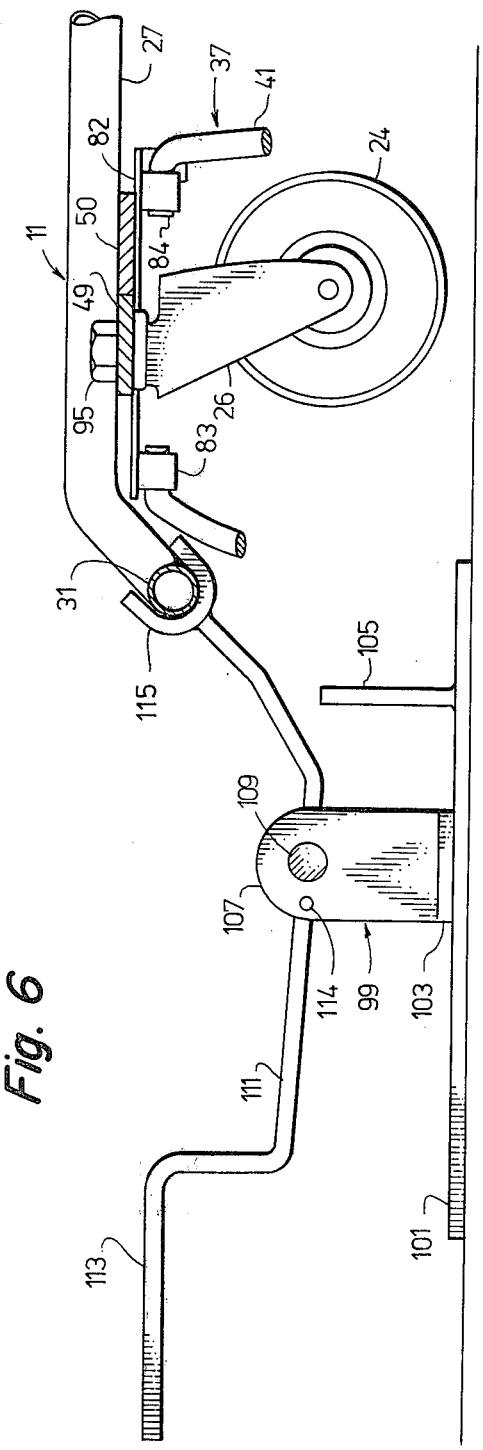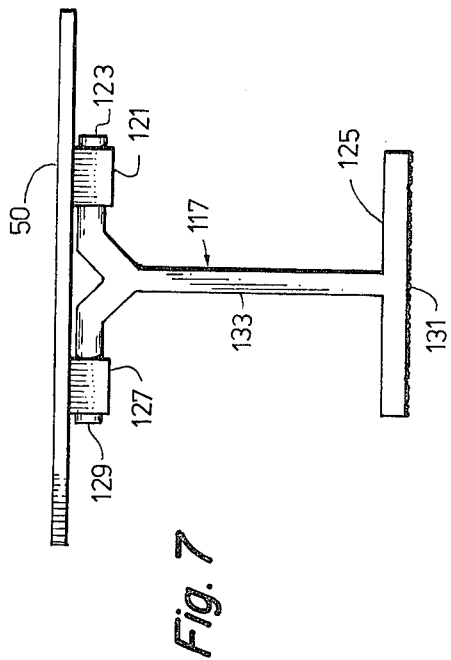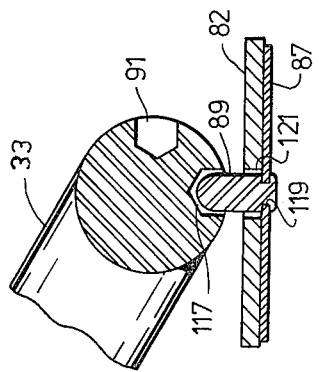

SKID ATTACHMENT FOR SHOPPING CARTS

This invention relates to a skid attachment for a shopping cart and to a shopping cart onto which such attachment has been installed. More particularly, it relates to such a device and a supermarket shopping cart incorporating it, which is useful under normal weather conditions with four operative wheels and has skids or skiis under the front wheels of the cart for use when the cart is to be pushed over snowy or icy areas, as in supermarket parking lots.

It is well known that shopping carts are utilized not only in supermarkets and other stores for carrying materials selected to a check-out counter, but are also employed to transport the purchased items to the customer's vehicle in the store's parking lot. In good weather pushing the cart through the lot is an easy task but when the lot is covered with ice and snow, as is the case during winter conditions in many areas, moving the cart, especially by pushing it in the normal manner, becomes difficult. In such circumstances customers may refuse to attempt to use the cart in the parking lot and may try to carry their parcels to their vehicles. Under conditions of poor footing this can lead to slipping, and accidents. Sometimes, when the customer is accompanied by another person, he or she may have that other person drive the vehicle to the store exit because it is too difficult to move the cart to the car, which can cause congestion at that location. When it is attempted to move the cart through a snowy parking lot it has been found that it is easier to pull it than to push it but this is awkward and is sometimes dangerous because the customer then often walks backward and cannot be as aware of vehicle movements in the lot as is desirable. For these reasons and others there has been a need to make supermarket shopping carts readily movable through supermarket parking lots despite adverse weather conditions under which the ground or pavement is covered with snow and/or ice.

In a search conducted in the United States Patent and Trademark Office in subclasses 280-7.12; 280-8; 280-9; 280-10; 280-11; 280-33.99 A; 280-33.99 C; 280-33.99 R; and 280-47.26, the only patent found that shows a shopping cart including a ski attachment is U.S. Pat. No. 4,163,564. None showed a skid attachment like that of this invention. Other patents found in the search which are considered to be of interest include U.S. Pat. Nos. 1,234,200; 1,343,046; 1,450,924; 2,518,561; 2,823,042; and 3,719,370. Of these it is considered that the most relevant are U.S. Pat. Nos. 1,234,200 and 1,450,924, both of which show full length sled runners which may be retracted to positions under a baby carriage so as to allow use of the carriage as a wheeled vehicle or a sled. However, none of the patents, either alone or in combination with others, describes or suggests the present invention, wherein an attachment for a supermarket shopping cart, readily installable thereon, includes skid members which are readily moved between operative and inoperative positions so as to allow use of the cart as a wheeled vehicle in the store, as a wheeled vehicle in the store parking lot under normal weather conditions and as a combination wheeled and skid-equipped vehicle, to facilitate movement of the cart through the parking lot under snowy and/or icy conditions.

In accordance with the present invention a skid attachment for installation on a shopping cart comprises a pair of skid members, means for selectively moving said skid members into inoperative and operative skid positions with respect to a shopping cart on which the attachment is installable, and combination mounting and positioning means, for holding the skid members in position on a shopping cart near front wheels thereof, so that on movement of the skid members into operative position they have skid surfaces thereof below the shopping cart wheels and bearing the weight of the cart instead of the front wheels thereof, thereby facilitating movement of the cart through snow. Also within the invention are shopping carts having such a skid attachment installed thereon or having equivalent operative parts incorporated therein. Also described herein are methods and apparatuses for raising shopping cart front ends and thereby facilitating movements of the skid members into operative position despite the weight of the cart contents bearing down on the cart front wheels.

The invention will be readily understood from the description herein, especially when taken in conjunction with the accompanying drawing, in which:

FIG. 5 is an enlarged partial, sectional view of a locking mechanism, shown on a smaller scale in FIG. 3, for selectively holding the skid members of the skid attachment in operative position, as shown, or in inoperative position;

FIG. 6 is a partially sectional side elevational view of a lower front part of a supermarket shopping cart, with the apparatus of this invention affixed thereto, in raised position, with the cart front wheels raised above the ground, by use of a lifting mechanism, to facilitate movement of the skid members of the attachment past the wheels and into operative position; and FIG. 7 is a front elevational view of a different cart lifting device, included as a part of the skid apparatus.

Figure 1:
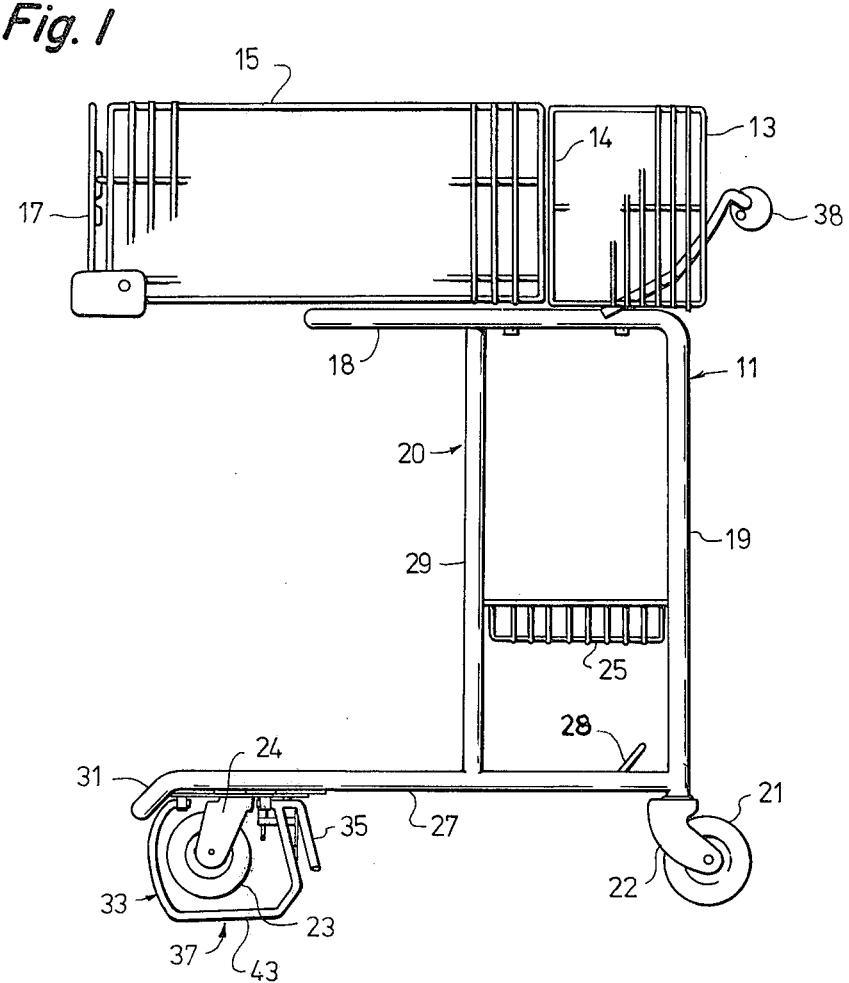
FIG. 1 is a side elevational view of a shopping cart with an attachment of the present invention installed thereon, which attachment is shown in operative position.

In FIG. 1 numeral 11 designates a supermarket cart on which there has been installed skid attachment 37 of the present invention. Cart 11, which is shown in U.S. Pat. Nos. 3,052,319; 3,245,498; 3,517,773; 3,813,111; 3,815,932; and Re. 25,616, is of a type which presently is becoming among the most popular of the supermarket shopping carts. Such a shopping cart is self-storing and nesting, with a basket compartment 13 including an optional baby seat, not shown and a wall 14, foldable down when desired, optionally separating it from main compartment 15. At the front of the main compartment of the shopping cart basket is openable wall 17, which is rotatable forwardly and downwardly to facilitate transfer to the check-out counter of items selected by the shopper. The various basket parts are supported on upper horizontal tubular framing portion 18, which is a part of a unitary frame 20, which also includes vertical tubular framing portions 19, 29 and 29a (see FIG. 2).

There is also a shorter framing member, like 29a, corresponding to frame 19, but not illustrated in the present drawing. Both framing portion 29a and the other such shorter framing portion extend upwardly from lower tubular framing part 27 to about the height of the top of auxiliary basket 25 and may have further horizontal extensions, not illustrated, to help support such basket. A bottom shelf 45, not shown in FIG. 1 except for a part 28 thereof, acts as a floor between lower framing parts 27. Forward part 31 of frame 20 is downwardly inclined, which facilitates multiple unit storage and nesting, in known manner. For such storage, in the cart illustrated in FIG. 1, basket section 15 is rotated 90° clockwise so as to assume a position above basket section 13. Affixed to lower portion 27 of frame 20 are back wheels 21, in mounts 22, and front casters 24 and 26, including wheels 23 and 39, respectively. A handle 38 is provided so that the cart may be conveniently pushed and steered. Although the illustrated cart is one which is highly preferably improved by installation thereon of the skid attachment of this invention, it should be understood that the invention is applicable to carts of various designs and types, nesting and non-nesting, self-storing and non-self-storing, metal wire and tubular construction or plastic construction, etc.

The skid attachment of this invention, shown in operating or skid position in FIG. 1 (on a slanting supporting surface, not illustrated), includes skid members 33 and 41 (FIG. 2) and a handle 35 for making it easier for a customer to place the skids in operative position when leaving the store to travel to her or his vehicle over a snow filled or ice covered parking lot. Because of the smaller scale of the illustration of FIG. 1 the means for positioning the present skid attachment on the shopping cart will be described with respect to FIG. 2 and details of attachment of the skid member will be described with respect to FIGS. 2-4.

Figure 2:
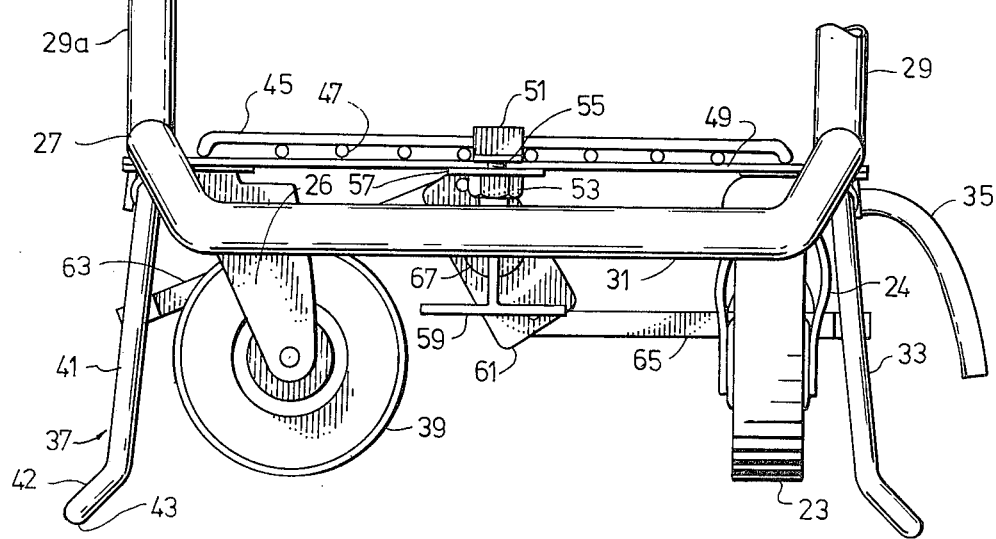
FIG. 2 is a partial, enlarged front elevational view of the shopping cart of FIG. 1 with a skid attachment of this invention in position thereon, in operative mode.

In FIG. 2 casters 24 and 26 are shown held to transverse bar or strap member 49, which is fastened to the under side of lower framing portion 27 at a location just to the rear of the downwardly inclined forward part 31 thereof. Bottom cart shelf 45, with longitudinal rods or wires 47, to which skid attachment 37 is held, has the skid assembly bolted to it so that the attachment is desirably mounted and positioned on the shopping cart, with a spacing and positioning member 50, not shown in FIG. 2, extending transversely with respect to the cart longitudinal axis and being positioned behind and adjacent to cart cross member 49, on which the casters are mounted. Mounting bracket 51, together with bolts 55 and 71, which pass through holes 73, and nuts 53 and 69 (also see FIG. 3) hold the attachment in place on the cart. Lockwashers are also preferably utilized to prevent loosening of the attachment, but they are not illustrated. Accommodating bend 68 in bracket 51 fits over shelf edge 45 and between longitudinal rods 47 so as to tightly hold skid attachment 37 in place. Yet the shelf is liftable for good nesting (it pivots about edge 45) and the skid attachment does not interfere with such lifting and nesting. In FIG. 2 front cart wheels 23 and 39 are shown, which are rotatable about horizontal axes and pivotable about vertical axes. The various other parts of the skid attachment are well illustrated in FIGS. 3-5 and now will be described with respect to them.

Figure 3:
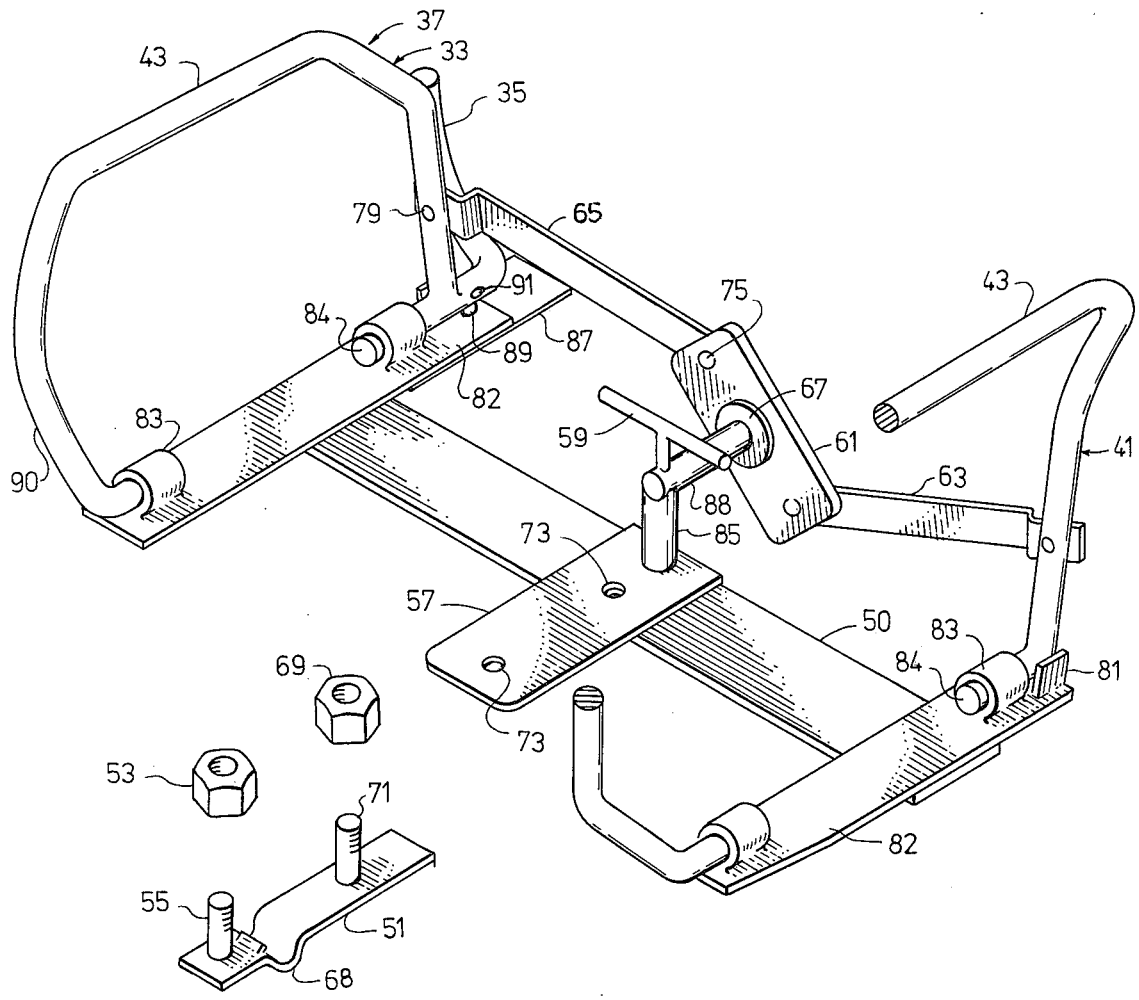
FIG. 3 is an enlarged perspective view of a skid attachment of this invention, seen from the bottom, considering installed position, with a portion thereof omitted and with holding or fastening means thereof being shown partially disassembled.
Figure 4:
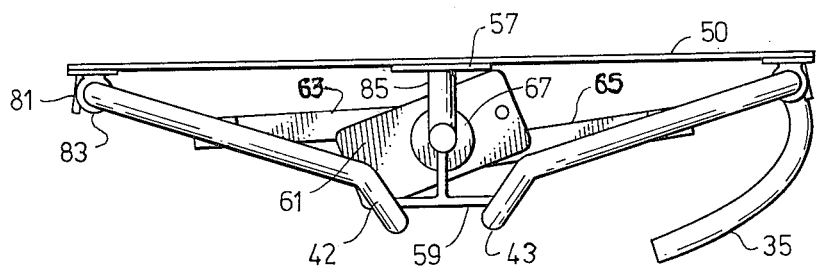
FIG. 4 is an end elevational view of the attachment of this invention shown in FIGS. 1-3, viewed from the front thereof, with the attachment being shown in installed and inoperative position.

In FIG. 3 skid attachment 37 is seen viewed from the bottom, or inverted, so that the various parts thereof may be better illustrated. It will be noted that the skid attachment assembly includes removable bracket 51 and plate 57, which is welded or otherwise suitably jointed to spacing or positioning cross-member 50. Such combination tightly holds the attachment to the bottom of the supermarket cart in the manner previously described. At the ends of member 50 longitudinally oriented flat plates 82, welded to the spacing member 50, provide mounts or bearings 83 in which generally C-shaped skid members 33 and 41, with the openings of the C's facing upwardly (as installed), are mounted by means of end or journal portions 84 thereof. The skid members have offset ends 42 and skid surfaces 43, which, as shown, are continuous portions of the rod materials from which the skid members are made, but in some aspects of the invention such surfaces may be larger, like skiis, or may include runners or portions of specially hardened steels or other materials so as to provide wear resistance and prevent premature thinning of the material at such wear surface. Skid members 41 are turnable via journal members 84 in bearings 83 so as to be selectively placeable in storage or inoperative position and in operative position, as desired. The skid members are moved in concert by means of linkages 63 and 65, held to the skid members by pins 79, which linkages are joined to partially rotatable plate 61 at pins 75. Plate 61 has mounted in it bearing member 67, preferably a ball or roller bearing, which turns about longitudinally oriented journal member 88, which is mounted on post 85, fastened to mounting plate 57. Thus, when handle 35 is moved from indicated position inwardly the skid members of the skid attachment are moved to storage or inoperative position. Instead of employing the handle means shown, various other types of mechanisms may be utilized to effect movements of the linkage parts and the skid members. For example, a flexible cable may be mounted so as to accomplish this from the handle or back portion of the shopping cart so that the user may merely tilt the front wheels of the cart upwardly and operate the activating means to place the skid members in operative position. Alternatively, threaded rod means may be connected to linkage plate 61 so that upon rotation of the rod the skid members will be moved. If desired, no such operating mechanism may be included and hand pressure applied to one of the skid members may be the means for shifting positions thereof, preferably while the cart front is being lifted.

To prevent undue strain on the linkage mechanism stops 81 are provided to limit movement to open or operative positions to the desired extent. Similarly, stop member 59 limits the movement of the linkage and the skid members to inoperative position. Desirably, such stop members are so located as to facilitate positioning of locking members for holding the skids selectively in either operative or inoperative position and for preventing unintentional movements out of such positions. They also prevent the linkage parts from being moved too far so that returns thereof are inhibited. One such locking mechanism is illustrated in FIG. 5 (and is also shown, on a smaller scale, in FIG. 3). In FIG. 5 a part of skid member 33 is shown having transverse openings or bores 91 and 117 therein, for positioning the skid members in operative position when pin 89 is in bore 117 and in inoperative position when such pin is in hole 91. Pin 89, in the mechanism illustrated, is held by spring plate 87, surrounding pin groove 119, and passes through clearance 121 in plate 82. Thus, in normal position the pin is urged downwardly (considering the orientation of the skid member on the shopping cart) but may be moved upwardly and out of engagement with either of holes 91 and 117 by moving spring plate 87 accordingly. Thus, to release the locking member and change positions of the skid members, one need only release pin 89 by movement of spring member 87 and rotate handle 35, as desired. When the skid is in desired position the pin will automatically lock by moving into the appropriate bore. The stop members and the locking member are so arranged and positioned as to act in conjunction, with the locks being effective when the skid members have been moved to the stops, thereby obviating any need for trying to locate the lock positions by eye or by movements of handle 35, and preventing undue strain on such locking mechanism (since the stops will take such strain). The locking mechanism illustrated is a single spring loaded one but various other locks and biasing devices may be used instead, too. For example, in one such apparatus, reduced to practice by the inventors, a simple door latch or bar bolt (a sliding rod) was utilized successfully.

Although it is not clearly shown in the drawing, because the additional lines would be confusing, in FIG. 2, the skid members 33 and 41, in addition to having skid parts 42 inclined outwardly beyond the cart frame, for cart stability, are inwardly directed toward the front 90 thereof to promote good nesting of the carts, especially in storage position.

To utilize the present skid attachment so as to facilitate movement of a loaded shopping cart through a snowy or icy parking lot, which movement is extremely difficult under normal circumstances without the skid attachment of this invention being employed, is relatively simple. The skid attachment may be removed from the cart during the summer months or may be left on year round. Of course, it will be in inoperative position during use of the cart in the store and will be activated upon leaving the store and entering the parking lot, when that lot is in such condition as to make ordinary wheeling of the shopping cart difficult. The shopper may bend down, lift the front end of the cart, release the locking mechanism, when present, and adjust the skid attachment so that the skid members are in operative position, after which she or he reengages the locking mechanism and lowers the cart. It has been found that the present relatively small skids, preferably with the contact surfaces being straight and the forward portions being curved, allow easy movement of the supermarket shopping cart over icy and snowy areas, even when it is heavily loaded. Surprisingly, steering is no problem with the present apparatuses and the presence of the rear wheels does not interfere unduly with movement of the cart. Because the skids raise the cart off the front wheels only they may be made much sturdier and much less expensive than skiis or skid means which extend under all the wheels of the cart. Additionally, they can be made self-storing and nesting, which is important.

Although it is relatively easy to utilize the present invention, in some instances, as when the shopper is not strong enough or is incapable of bending (and when the cart is not equipped with "remote control" mechanisms for actuating the skid members) auxiliary equipment may be used and different methods may be employed so as to raise or lower the skid mechanism easily.

In FIG. 6 the lower portion 27 of the framing member of supermarket cart 11 is illustrated with skid attachment 37 fastened thereto. As illustrated, forward caster 26, supporting wheel 24, is joined to transverse cart bar or plate 49 by nut 95. Plate 49 is suitably fastened to lower framing portion 27. Behind caster 26 is transverse holding and spacing member 50, to which is joined longitudinal member 82, at the side thereof, with bearings 83 and journals 84 being held thereto and with skid members 41 thereby being rotatably held to the mounting and positioning means of the skid attachment. As illustrated, the cart wheel 24 and the other cart parts associated therewith, are in partially raised position, with lifting device 99, shown as foot operated but also capable of being otherwise actuated, having a backwardly (with respect to the shopping cart) and upwardly directed open or U-shaped end 115 fitting about and contacting the lowermost part of the downwardly inclined forward portion 31 of the shopping cart frame. It will be apparent that the lifting device includes a longitudinal base member 101, with a transversely positioned mounting portion 103, having vertical walls 107, with openings therein for a bearing, not illustrated, in which a journal or pin 109 may partially rotate. Fitting or contacting portion 115 of lifting device 99 is at one end of the lifter and the device includes a foot pedal or other foot operated part 113 at the other end thereof, with a connecting lever portion 111, communicating with the end part, adapted to contact the shopping cart frame. On depressing of the pedal or rod 113 the shopping cart is lifted. However, although such lifting makes it easier to place the skid attachment in operative position, it is still somewhat awkward to hold down rod 113 and move skid attachment 37, so it is preferred that a spring biased locking mechanism, illustrated at numeral 114, be employed, to hold the lifter in position once the cart has been raised. Such lock may be released manually after positioning of the skid attachment so that the cart may be lowered onto the skids. Stop 105 is shown as a means for holding the lever in position and preventing it moving downwardly farther than that position at which it may normally make suitable first contact with the front end portion 31 of the lower frame 27 of cart 11. Such stop height may be adjustable. Thus, when the lever is in start position, merely moving the supermarket shopping cart against it will automatically position the frame with respect to lever part 115, so that the cart may then be raised to desired height merely by pushing it against the lifter.

In FIG. 7 there is shown a different mechanism for lifting the cart to assist in moving the skids into operating position. Such mechanism, designated by numeral 117, is normally storable in substantially horizontal position forwardly of a combination mounting and positioning means 50 of the skid attachment. As shown, bearings 121 and 127 and journal portions 123 and 129 constitute rotatable mounting means, in which the journals are rotatable about a transverse horizontal axis, for mounting lifting device 117 on the skid attachment and the cart. The lifting device includes a base portion 125 which has a roughened surface thereon 131 for frictionally engaging the ground or other such support. Such base is connected to the rotatable means by connecting means 133, which, in the embodiment illustrated, is a cylindrical rod. The lifting device is normally held in elevated position by friction, spring means or a releasable catch, and may be dropped or pushed downwardly into ground engaging position when it is desired to lift the cart to facilitate movement of the skid attachment into operative skid position. Such downward movement of the lifting device can be effected manually from the front of the cart or may be promoted by means of a flexible cable or other connector mechanism or linkage from the front or back (handle portion) of the cart. After the frictional portion 131 of base 125 engages the ground or other support it is a simple matter merely to push the cart forward and it will ride up on the lift device as that rotates and moves vertically. A stop, not illustrated, may also be provided to prevent the connecting rod going past its uppermost position. After raising of the cart and placing of the skid member in operative position, the lifting device may be returned to initial horizontal orientation by pulling the cart backward.

The various cart attachment and auxiliary device parts mentioned will normally be made of steel, preferably chromium or nickel plated, but other metals, including aluminum, stainless steel and various other ferrous and non-ferrous metal alloys may also be utilized, as may be synthetic organic polymeric plastics and fiber reinforced plastics (especially the "engineering plastics") and laminates, for certain portions of the apparatuses. The various mechanical elements of the apparatuses may be replaced by others that will perform the same or similar functions effectively. Thus, for example, different types of engaging, locking, lifting, adjusting and fastening means may be substituted for those illustrated.

Various advantages of the present invention have either been alluded to or have been previously mentioned but some of these and additional advantages will now be listed (but the list is not to be considered as exhaustive). First and foremost, the invention provides for an easy means for overcoming adverse winter conditions in the more northern states, and facilitating the use of shopping carts in the normal push manner in supermarket parking lots which may be covered with ice and snow. The invention promotes safe use of the carts, allowing them to be moved forwardly in the normal direction. The retractable skids, in effect, lift the front wheels off the ground, preventing bogging down of the shopping cart due to the wheels being imbedded in snow or being stuck in rough ice formations. In operative position the skids provide for greater stability, being outwardly directed, as well as downwardly, so that the contacts of the skids with the supporting surface are about at the distance apart of the rear cart wheels. This increased stability feature is obtainable and yet the carts remain satisfactorily nesting and self-storing.

Although the skids are relatively thin (and strong) it has been found that they are capable of satisfactorily supporting the cart and of acting as a sliding surface for it in a parking lot under bad weather conditions. (The cart is not intended for use in very deep snow but will be operative under moderate snow and ice conditions). Surprisingly enough, although the skids are fixed in a longitudinal direction they do permit easy sliding steering, even on bare parking lot pavements, providing that such are wet or damp or are otherwise lubricated.

The invented skid attachment is retained with the cart (individual skids cannot be lost, removed or otherwise separated from the attachment). By virtue of the type of installation possible, it does not interfere with nesting features of the supermarket shopping cart and the bottom shelf, which is raisable on some such carts to facilitate nesting, can still be lifted as a plurality of the carts is stored away ready for use. In addition to the storage capabilities of carts equipped with the present skid attachments they may also be moved over the surface of a snowy or icy parking lot as a nested train. Most shoppers are familiar with the sight of a young supermarket clerk to whom is assigned the unhappy task of collecting the shopping carts from the parking lot. His job is especially difficult in bad weather and under snowy and icy conditions. During good weather, as he collects the carts he nests them so that he may push a plurality of them back to the store and thereby cut down on the number of trips needed. In bad weather it is very difficult to manage more than one or two carts at a time, but when they are equipped with the skid attachments of the present invention it has been found that although the number of carts being pushed may not be as great as in good weather, it is still possible to push as many as five or six carts over snowy surfaces, having only the skids of the first cart in operative position. The skid attachments from the various carts (or every other cart) may be used at the same time in such a cart train providing that the attachments are so constructed and of such size as not to interfere with nesting, in which case, more carts may be pushed at one time despite the snow or ice.

The one somewhat difficult operation that has to be performed in using the present attachment is the lifting of a cart front to permit moving of the skid members into operative position. Of course, it is also important that after the skid members are in operative position they should be locked or firmly held in place so that the weight of the cart will not be returned to the wheels, as when a turn is made and sideward pressure is applied to a skid member. Some means for more readily raising the cart into position for activation of the skid attachment have been described but it will be apparent that various other ways of accomplishing this are also possible. For example, one way is to pull the cart over an inclined plane between the wheels so that the cart and the wheels will be lifted off the ground, with a clearance being supplied between the plane structure and the portion of the cart behind the front longitudinal base tubing thereof so that the skids will be freely movable to position. Another way is to use some type of hoist mechanism or to assign a store clerk to the task of lifting the cart and pulling the skids in position. However, lever mechanisms, such as those previously described, are normally preferable. The illustrated linkages for moving the skid members into and out of operative position have been shown in the embodiment of this invention as being operated by handle actuation at the site of the attachment. However, it is contemplated that remote operation thereof may be effected, by linkages, rotatable shafts, flexible cables or other suitable means, preferably passing along or through portions of the framing of the cart and being operable at the handle or other convenient location thereon. Similarly, the locking mechanism, if one is employed (spring loading or similar semi-automatic locking may be preferable) may be remotely actuated. Instead of installing and removing the present apparatus it may be left on year round and in some instances the skid "attachment" may be built into the apparatus as a integral part thereof.

Due to the compactness of the present attachment it is of superior strength and is capable of resisting the hard treatment absorbed by shopping carts. For example, because relatively little material is employed in its construction, with only the front wheels having lifting skids associated with them, the various plate members, linkages, stops, etc. (the flat items) may be of a thickness within the range of 2 to 7 millimeters, preferably 3 to 6 mm., e.g., 5 mm., and the bar structures may be from about 6 to 16 mm., preferably 8 to 14 mm., e.g., 11 mm. in thickness but it is also within the invention to utilize other sizes of materials, too. Of course, when stronger materials of construction are employed thinner parts may be utilized too.

In addition to the above recited advantages, various others will be apparent to those of skill in the art from the previous descriptions.

Although various embodiments and illustrations of the invention have been mentioned and preferred embodiments have been described, it will be clear to those of skill in the art, with the present description before them, that various substitutes and equivalents may be employed without departing from the invention.

What is claimed is:

1. A shopping cart incorporating a removable skid attachment, to facilitate use of such cart in snow, which comprises a nestable supermarket shopping cart, nestable with other such carts by horizontal relative motion thereof, which cart includes a pair of front wheels, each of which is rotatable about a horizontal axis which is transverse to the longitudinal axis of the shopping cart when the cart is being moved forwardly and which wheels are movable about a vertical axis, and a pair of rear wheels, each of which is rotable about a horizontal transverse axis in a vertical plane parallel to the longitudinal axis of the cart, a removable skid attachment which includes a pair of skid members, each of which is substantially C-shaped, which members are simultaneously movable into inoperative and into operative skid positions, as desired, with respect to the shopping cart, so that when the skid members are in operative position they are below the shopping cart front wheels and alongside and outside of such wheels, bearing the weight of the cart instead of the front wheels bearing such weight, with the open ends of the C's being up, and so that when the skid members are in inoperative position, which is a retracted or storage position, they are above the bottoms of the front wheels, inside such wheels and subtantially horizontal, and combination mounting and positioning means, for selectively holding the pair of skid members in operative and inoperative positions on a shopping cart near the front wheels thereof and away from the back wheels thereof and for moving the pair of skid members between operative and inoperative positions, with the C's passing under the front wheels during such movements, which shopping cart—skid attachment combination is nestable with other such combination apparatuses when the skid attachments thereof are in inoperative positions.

2. A shopping cart according to claim 1 wherein portions of the C-shaped skid members having skid surfaces for contact with a supporting surface on which the shopping cart with the skid attachment installed rests in operative position, are substantially straight.

3. A shopping cart according to claim 2 which includes locking means for selectively holding the skid members in retracted and operative positions.

4. A shopping cart according to claim 3 which includes stop means to help position the skid members in desired operative position.

5. A shopping cart according to claim 7 which includes stop means to help position the skid members in desired inoperative position, and said stop means and the stop means for helping to position the skid members in desired operative position are so located as to facilitate operation of the locking means selectively holding the skid members in desired operative or inoperative position.

6. A shopping cart according to claim 5 wherein the cart includes a member which is transverse to the vertical longitudinal axis thereof near the front wheels and in which the combination mounting and positioning means comprises a transverse member for positioning against the shopping cart transverse member, a member joined to said transverse combination means member and having means for fastening to the shopping cart transverse member to hold the skid attachment in position, longitudinally oriented supporting members at the ends of the skid attachment transverse member, and bearing means on said longitudinal members for movably supporting the C-shaped skid members at journal portions thereof, and means for selectively moving the skid members into inoperative and operative skid positions, which include an axially positioned bearing member, held to the combination mounting and positioning means, a rotatable element, transversely and vertically partially rotatable about or with said bearing, and linkages connecting said element to the skid members, so that both said members are selectively movable in concert to operative and inoperative positions.

7. A shopping cart according to claim 6 wherein the transverse member thereof is mountable on the shopping cart behind the shopping cart transverse member, abutting it and in substantially the same plane, and the C-shaped skid members include curved forward portions to facilitate movement through snow of a shopping cart on which the attachment is mounted when the skid members are in operative position.

8. A shopping cart according to claim 7 wherein the straight portions of the C-shaped skid members, having skid surfaces thereon, are offset outwardly and the skids are inclined inwardly forwardly so as to facilitate nesting of the shopping carts on which they are installed.

9. A shopping cart according to claim 1 which includes locking means for selectively holding the skid members in retracted and operative positions.

10. A shopping cart according to claim 9 which comprises stop means adapted to prevent movement of the skid members past the positions at which locking means selectively hold the skid members in retracted and operative positions.

* * * * *